US009715476B2

(12) United States Patent
Megiddo et al.

(10) Patent No.: US 9,715,476 B2
(45) Date of Patent: Jul. 25, 2017

(54) COLLABORATIVE AUTHORING WITH SCRATCHPAD FUNCTIONALITY

(71) Applicant: Microsoft Corporation, Redmond, WA (US)

(72) Inventors: Eran Megiddo, Redmond, WA (US); David Rasmussen, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 503 days.

(21) Appl. No.: 13/860,127

(22) Filed: Apr. 10, 2013

(65) Prior Publication Data
US 2014/0310345 A1 Oct. 16, 2014

(51) Int. Cl.
G06F 15/16 (2006.01)
G06F 15/163 (2006.01)
G06Q 10/10 (2012.01)

(52) U.S. Cl.
CPC ......... G06F 15/163 (2013.01); G06Q 10/101 (2013.01)

(58) Field of Classification Search
CPC .................................................. H04L 12/1822
See application file for complete search history.

(56) References Cited

U.S. PATENT DOCUMENTS 7,933,952 B2* 4/2011 Parker et al. ................. 709/204
7,962,853 B2* 6/2011 Bedi et al. .................... 715/751
8,073,811 B2* 12/2011 Strathearn ......... G06F 17/30017
 707/608
8,825,758 B2* 9/2014 Bailor ............... G06F 17/30168
 709/204
2006/0026502 A1* 2/2006 Dutta .................... G06Q 10/10
 715/230
2008/0059539 A1* 3/2008 Chin et al. .................... 707/203
2010/0235763 A1* 9/2010 Massand ....................... 715/753
2010/0257457 A1 10/2010 De Goes
2012/0023418 A1 1/2012 Frields et al.
2012/0233543 A1 9/2012 Vagell et al.
2013/0179515 A1* 7/2013 Chi et al. ...................... 709/206
2013/0218845 A1* 8/2013 Kleppner et al. ............. 707/687
2013/0283147 A1* 10/2013 Wong et al. .................. 715/234

OTHER PUBLICATIONS

"Collaborating in Really Real-Time", Retrieved at <<http://etherpad.org/>>, Retrieved Date : Feb. 6, 2013, pp. 4.
Rigsby, Josette., "Microsoft Add Real-Time Collaboration to Office Web Application", Retrieved at <<http://www.cmswire.com/cms/enterprise-collaboration/microsoft-add-realtime-collaboration-to-office-web-application-011945.php>>, Jul. 11, 2011, pp. 3.

* cited by examiner

Primary Examiner — Umar Cheema
Assistant Examiner — Tesfu Mekonen
(74) Attorney, Agent, or Firm — Turk IP Law, LLC

(57) ABSTRACT

Real-time co-authoring and support for the collaborative process is enabled by making it easy to initiate a collaborative document, to invite the proper people into the process, to collect existing artifacts, thoughts, and research, and then to divide and track the work to completion across a collaborating group. Monitored changes, comments, and similar input by the collaborating authors may be presented on demand or automatically to each author based on changes and/or comments that affect a particular author, that author's portion of collaborated content, type of changes/comments, or similar criteria Real-time or sequential communication such as email, text messaging, and video chat, may be enabled to further optimize the collaboration process.

20 Claims, 12 Drawing Sheets

COLLABORATIVE AUTHORING WITH SCRATCHPAD FUNCTIONALITY

BACKGROUND

Content processing applications and services, especially textual content, provide a number of controls for selecting, modifying aspects of content such as formatting, grammatical or stylistic corrections, even word replacements through synonym/antonym suggestions. In typical systems, such controls are available individually, sometimes independently or interdependently. Thus, users may be enabled to select and modify aspects of content they create or process, but they have to do it manually.

Content creation or modification in collaborative environments, where content may be created and processed by multiple users simultaneously and/or sequentially, may be specially challenging for authors trying to keep track of their own changes as well as others. True collaboration involves a combined thought process and may be hampered by the sequential nature of conventional systems, where one co-author's comments/edits need to be reviewed by the others and responded to in an orderly fashion. Even if an order is established and the edit/comment exchange process optimized, it may be challenging to create a consistent and coherent voice for the collaborative content.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to enabling real-time co-authoring and support for the collaborative process end-to-end by making it easy to initiate a collaborative document, to invite the proper people into the process, to collect existing artifacts, thoughts, and research, and then to divide and track the work to completion across a collaborating group. Naturally integrated real-time or sequential communication means may be provided to enhance the collaboration and optimize the content creation process.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
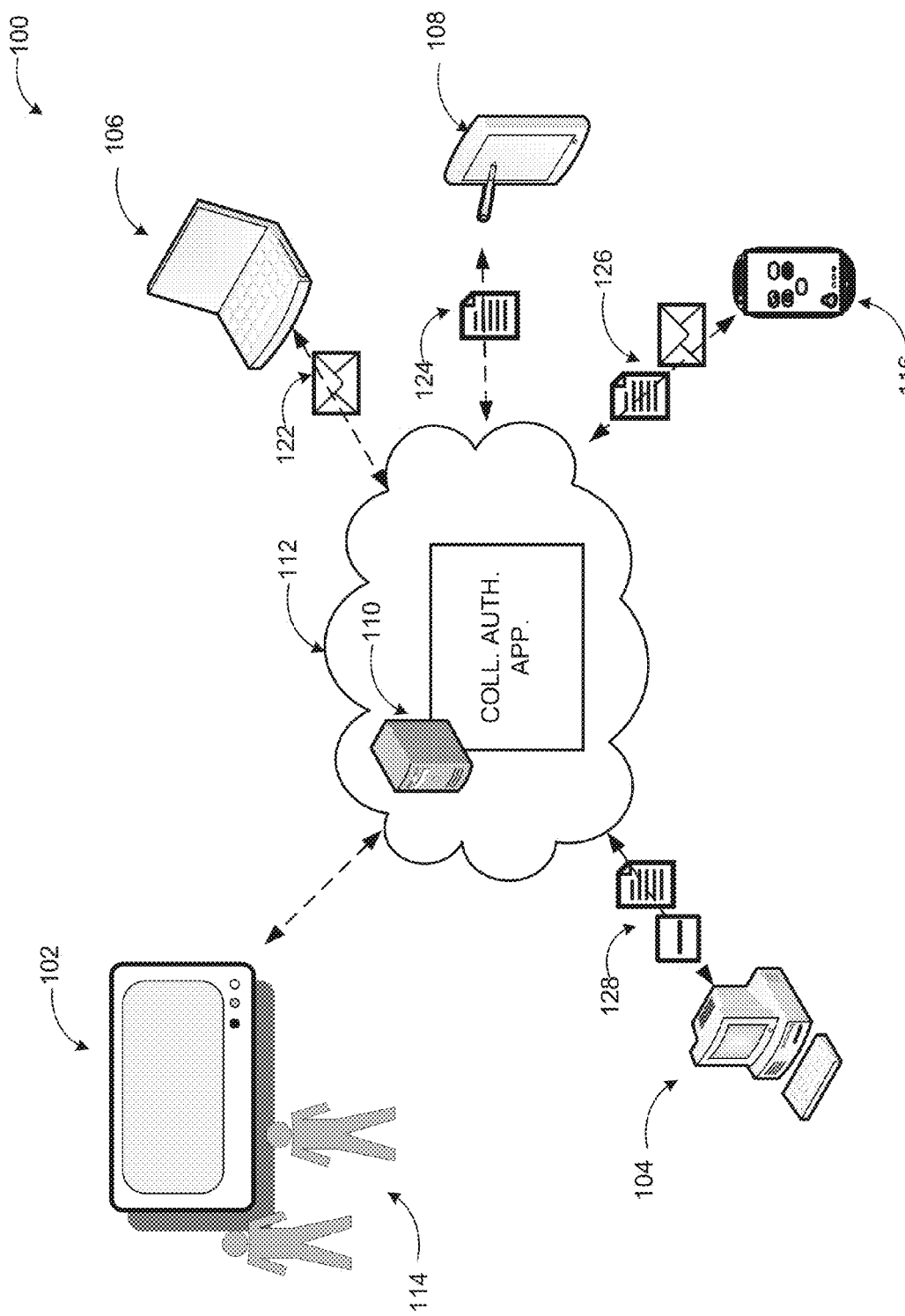
FIG. 1 includes a conceptual diagram illustrating a local and networked configuration environment, where real-time co-authoring with scratchpad functionality may be implemented.

As briefly described above, collaborative document may be initiated; proper people may be invited into the process; existing artifacts, thoughts and research may be collected; and the work divided and tracked to completion across a collaborating group. Unification may be provided on a no-save model across the web applications while integrating modern commenting and communication methods.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for content collaboration with scratchpad functionality. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Referring to FIG. 1, conceptual diagram 100 illustrates a local and networked configuration environment, where real-time co-authoring with scratchpad functionality may be implemented. The computing devices and computing environments shown in diagram 100 are for illustration purposes. Embodiments may be implemented in various local, networked, and similar computing environments employing a variety of computing devices and systems.

Diagram 100 represents a networked computing environment, where a collaborative authoring application (or service) 110 executed on a server may be accessed by a plurality of authors such as authors 114 to create and process content individually or collaboratively. The collaborative authoring application 110 may be accessed via network 112 by browsers or locally installed client applications on a desktop computer 104, a laptop computer 106, a tablet 108, a smart phone 116, a smart whiteboard 102, and similar devices. The collaborative authoring application may also be part of a hosted service executed on one or more servers.

The collaborative authoring application 110 may enable authors to create and modify content including, but not limited to, text, images, graphics, embedded objects (e.g., audio, video objects, etc.). Authors may create distinct portions of the content to be combined into a single, coherent work, may modify each other's or their own) work, comment on each other's work, provide notes, and reply to comments/changes. Notifications of changes, comments, notes, and replies on the collaborative content (124, 126, 128) may be provided through various communication means, such as email 122, text messages, publication to social/professional networks, blogs, and similar means. The collaborative authoring application 110 may be a word processing application, a presentation application, a spreadsheet application, a note taking application, and comparable ones.

A collaborative authoring application according to embodiments may enable any end-point enabling real-time co-authoring and support the collaborative process end-to-end. In an example scenario, a collaborative document may be initiated; proper people may be invited into the process; existing artifacts, thoughts and research may be collected; and the work divided and tracked to completion across the group. Unification may be provided on a no-save model across the web applications, for example, while integrating modern commenting and communications.

The example systems in FIG. 1 have been described with specific servers, client devices, applications, and interactions. Embodiments are not limited to systems according to these example configurations. A platform providing a collaborative authoring environment with scratchpad functionality may be implemented in configurations employing fewer or additional components and performing other tasks. Furthermore, specific protocols and/or interfaces may be implemented in a similar manner using the principles described herein.

Figure 2:
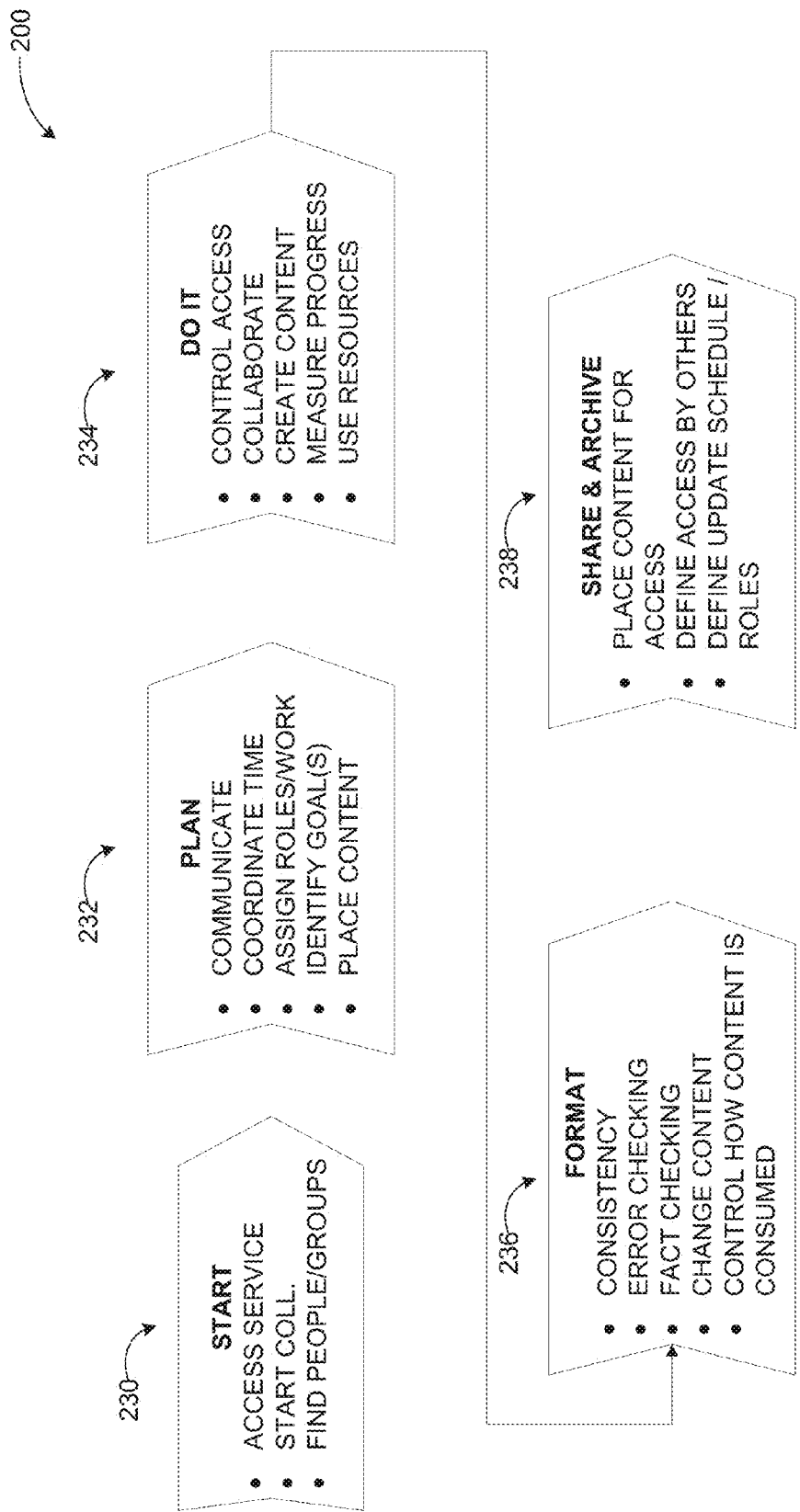
FIG. 2 illustrates an overview of a collaborative authoring process according to some embodiments.

Referring to FIG. 2, diagram 200 illustrates an overview of a collaborative authoring process according to some embodiments.

In a conventional system, a collaborative authoring project may include face-to-face meeting of collaborators for definition of goals, exchange of email addresses, etc. Meetings and roles may be scheduled/assigned through email or other means, but may prove to be challenging specially if there is lack of coherence among group members. Idea planning may include creation of a repository, a timeline (e.g., a spreadsheet), an outline, and details of goals/objectives/roles. All these activities may also take time and resources before the collaboration project even begins.

The execution of the project may include lot of back and forth among group members, where version management may have an increasing level of difficulty proportional to the number of collaborators since everyone may have differing opinions, styles, etc. Editing (specifically for a single voice) may take even more back and forth. Typically, the formatting/error-checking/fact checking tasks may be assigned to a single group member for efficiency. Thus, while modern communication technologies may enable easier exchange of ideas, real-time collaboration on content creation is still a challenging process.

As shown in diagram 200, a real-time collaborative authoring process according to embodiments may include a number of stages. At the start stage 230, one or more collaborators may access a collaborative authoring service through a thick or thin client (e.g., a browser) from any computing device. The collaboration may be started by inviting others through the collaborative authoring service (e.g., email, text message, or similar invite) or finding a group that already exists.

At planning stage 232, a team coordinator may communicate with co-authors about the project, coordinate their time with others, determine assigned work portions and see where they stand in regards to goals set for the project. Content may be placed at a location (e.g., a dedicated storage area for the collaboration group), where it can be easily accessed.

At the main collaboration stage 234 ("Do It"), the team coordinator may control access by others to information about him/her as well as each other, collaborate on portions of the content, find ideas on how to create content, for example, by leveraging work that has already been done. In creating the content, existing content may be incorporated into what the authors are doing. Co-authors may be provided up-to-date information on each other's contributions such as newly created content, edits, comments on each other's work, etc. Collaborators may be enabled to initiate communication with each other individually or groups) such as email exchange, text message sessions, video chats, and comparable ones. The service may provide information to the collaborators on significant items related to the project, allow them to catch up on things they may have missed (e.g., comments/edits since they have accessed the service last time), a enable merging of multiple communications channels into one (a user interface panel showing summaries of emails, text messages, and other communication related to the collaboration). Collaborators may also review past communications, compare content versions, and annotate content (notes, etc.).

At formatting stage 236, the created content may be checked for errors (grammatical, formatting, style), factual accuracy, and consistency. A single voice may be achieved through automated suggestions based on collaborative environment, type of content, organizational norms, others' usage, and similar factors. In some scenarios, content may be changed to accommodate issues discovered with any of the above-listed items. The collaboration team may also be enabled to control how others may consume the content. For example, restrictions may be placed on splitting the created content. Different versions (style, language, formatting) may be created for different consuming audiences, and so on.

At share and archive stage 238, the content may be placed at a location (e.g., a cloud) for others to have access to it. The access may be controlled through restrictions based on permissions or similar means. The system may maintain an integrity of the content wherever it is consumed and enable the collaborators to define update schedules and roles (who is supposed to update which portion of the content when).

Figure 3:
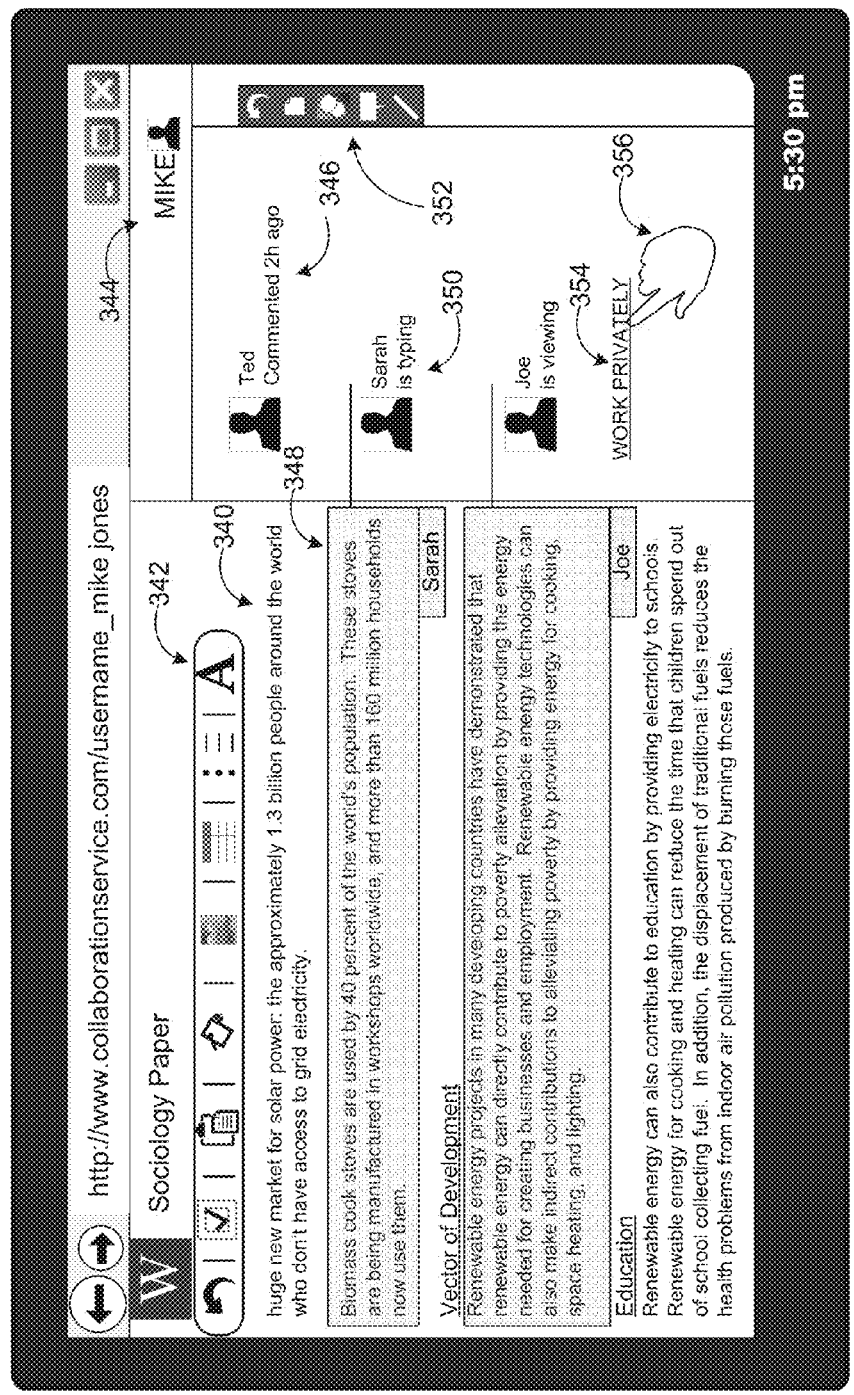
FIG. 3 illustrates a screenshot of an example collaborative authoring user interface with co-author activity being presented according to other embodiments.

FIG. 3 illustrates a screenshot of an example collaborative authoring user interface with co-author activity being presented according to other embodiments.

In the example screenshot 300, a sociology paper is being collaboratively created by a team. The user interface presents the created content 340 with editing controls 342. In a complementary user interface adjacent to the presented content, a list of collaborators and their respective changes, comments, and/or status may be provided. For example, an image or representative icon of a collaborator may be shown along with what that collaborator did (e.g., comment 346) and a timing of the action. In another example, a status 350 of another collaborator may be presented in the same complementary user interface such as typing or viewing the created content. This way, the collaborators may determine who is online, who is available and initiate a conversation with the available collaborators. A control 354 may enable the user 344 to switch to a private working mode, where the user may be able to create or edit content without the others seeing immediately. Thus, the collaborative authoring service may provide a scratchpad to the collaborators that can be a private scratchpad and converted to a shared scratchpad through a single action (356). This ease of transition may enable collaborators to share ideas without prolonged back and forth exchanges.

The listed collaborator actions may also be tied to a highlighted portion 348 of the content associated with the action (change, edit, creation, comment, etc.). Through a two-way interaction between the main user interface and the complementary user interface, a user may be enabled to select a portion of the content on the main user interface and see a list of collaborator actions associated with that portion on the complementary user interface. Alternatively, the user may select one of the, for example chronologically presented, collaborators on the complimentary user interface and see the related portion of the content highlighted.

A collaborative authoring application user interface may also present additional controls 352, which may be activated by touch or gesture input, for example, to switch between different modes or user interfaces, providing a comment, editing the content, publishing the content or an author's edits, etc. The information associated with the collaborators and modified content may be hidden/presented based on current user's choice (e.g., toggling of a control on the user interface).

The browser user interface shown in the screenshot 300 is for illustration purposes. In addition to standard elements such as an address of the current web page, a search box, command menus, and a tab indicating the web page, other elements may be provided in various locations and in any order using the principles described herein. A collaborative authoring application user interface may also include custom elements like in a locally installed and executed application.

Figure 4:
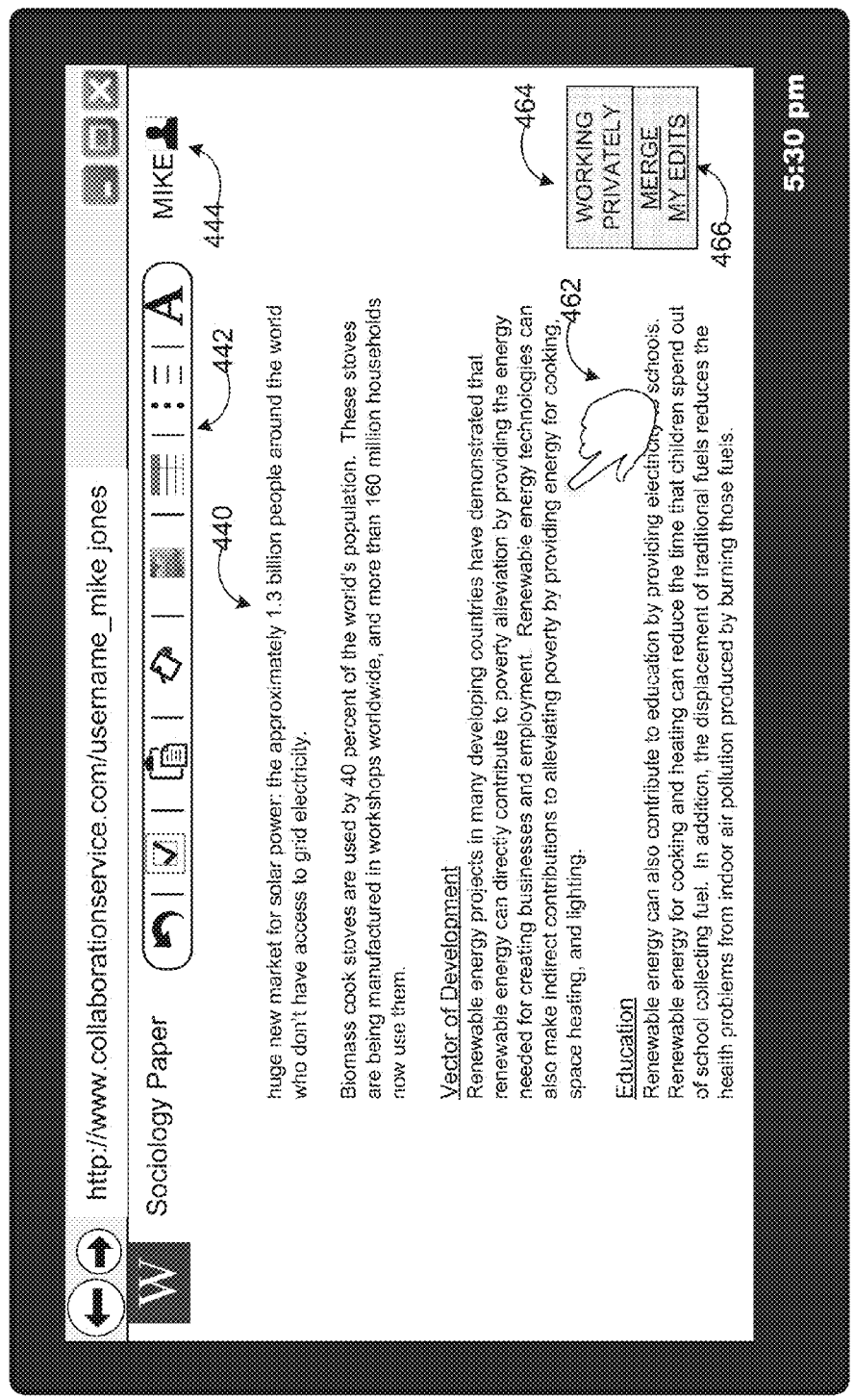
FIG. 4 illustrates a screenshot of an example collaborative authoring user interface in private working mode.

FIG. 4 illustrates a screenshot of an example collaborative authoring user interface in private working mode.

Screenshot 400 shows the main user interface of the collaborative authoring service with the created content 440 and edit controls 442 for user 444. Upon activation of the private working mode control discussed above, the complementary user interface presenting the collaborators may be hidden and an indication 464 displayed informing the user that he is in private working mode. The user may be able to edit the content through a variety of input mechanisms such as touch 462. When the user is done working in private mode, he may be enabled to switch to the collaboration mode by merging his edits to the shared content through the merge control 466.

FIG. 5A through 5D illustrate screenshots of example user interfaces for exchanging various modes of communication associated with a collaboratively created content among the co-authors according to some embodiments.

In screenshot 500A, a notification user interface of a collaborative authoring application is shown for a particular author 544 (Mike Jones). While viewing the created content 540 on a main user interface along with edit controls 542, the author may be presented a complementary user interface displaying a list of existing conversations 570 associated with the collaborative content. The list may include, for example, images or representative icons of participating collaborators along with their names and a timing of the conversation (e.g., conversations 572 and 574). Other formats and styles of presenting available conversations may also be used. In some example embodiments, the author may be enabled to select a listed conversation and view the contents of the conversation or join the conversation if it is still going on. In other embodiments, a conversation starting control 576 may be provided to initiate a new conversation. The conversations may be tied to specific portions of the content such that the relationship between a conversation and specific portion(s) of the content can be preserved for subsequent viewing by the collaborators.

Figure 5A:
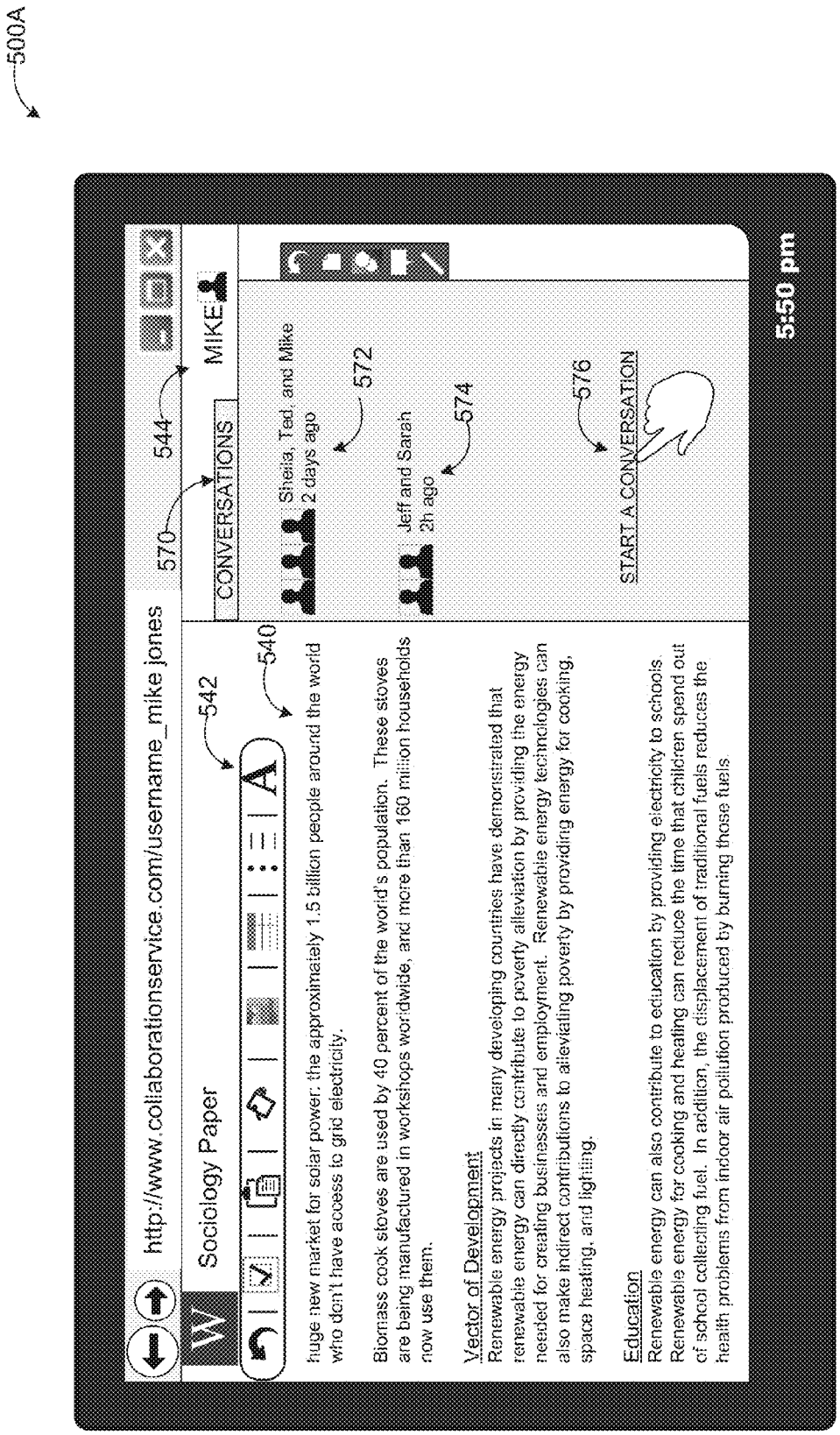
FIG. 5A through 5D illustrate screenshots of example user interfaces for exchanging various modes of communication associated with a collaboratively created content among the co-authors according to some embodiments.
Figure 5B:
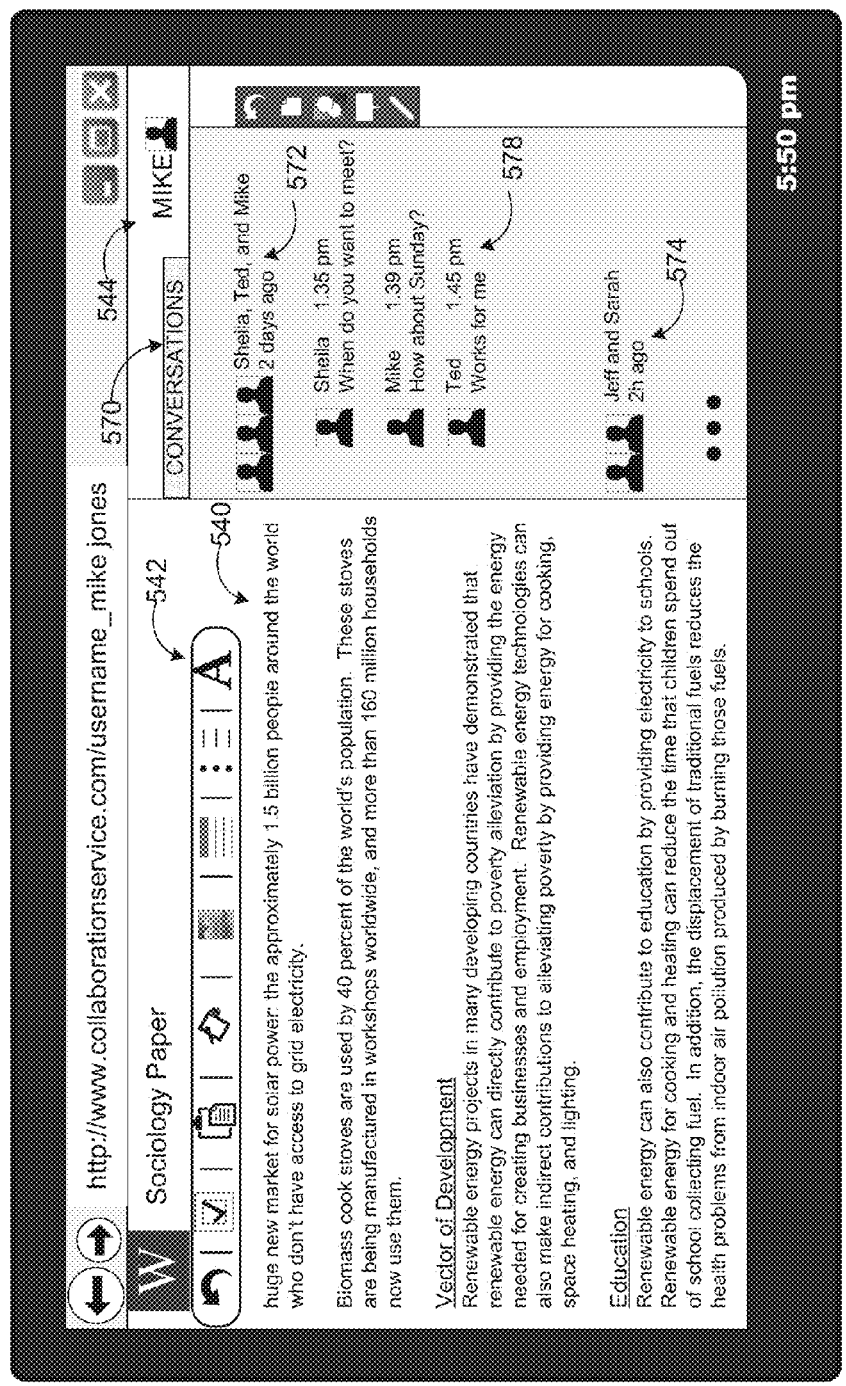

Screenshot 500B of FIG. 5B is similar to the screenshot 500A with the difference of conversation details 578 being shown below the listing of the conversation 572 (individual participants' comments). The conversations may be in form of email exchange, text message exchange, audio or video chat, or even posted comments on the collaborative authoring user interface.

Figure 5C:
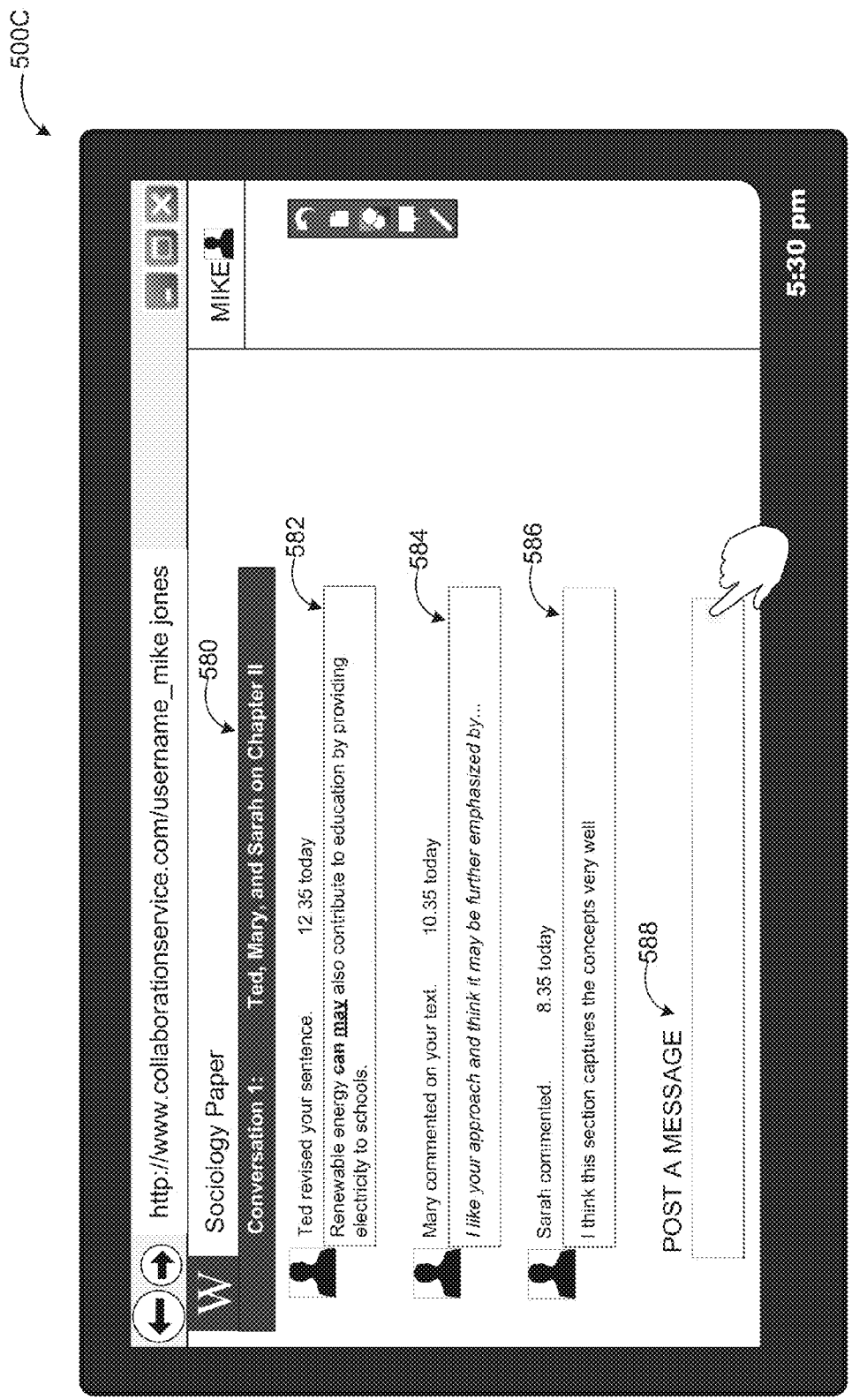

Screenshot 500C of FIG. 5C is another example user interface displaying conversation details. Upon selection of a conversation on the user interface of screenshot 500A, a full user interface with conversation details may be presented according to some embodiments. The conversation user interface may include a summary 580 of the selected conversation presenting a conversation identifier, participants, relation to the content, and/or any other relevant information. Items in the conversation such as comments or edits may be displayed along with an identity of the respective participants. For example, an edit (revision) 582 may include a nature and timing of the edit along with the edit itself. Comments 584 and 586 are displayed in a similar manner. A participation control 588 may include a text box to input a message to the other participants or other similar controls (e.g., one to initiate a video chat) may also be presented.

Figure 5D:
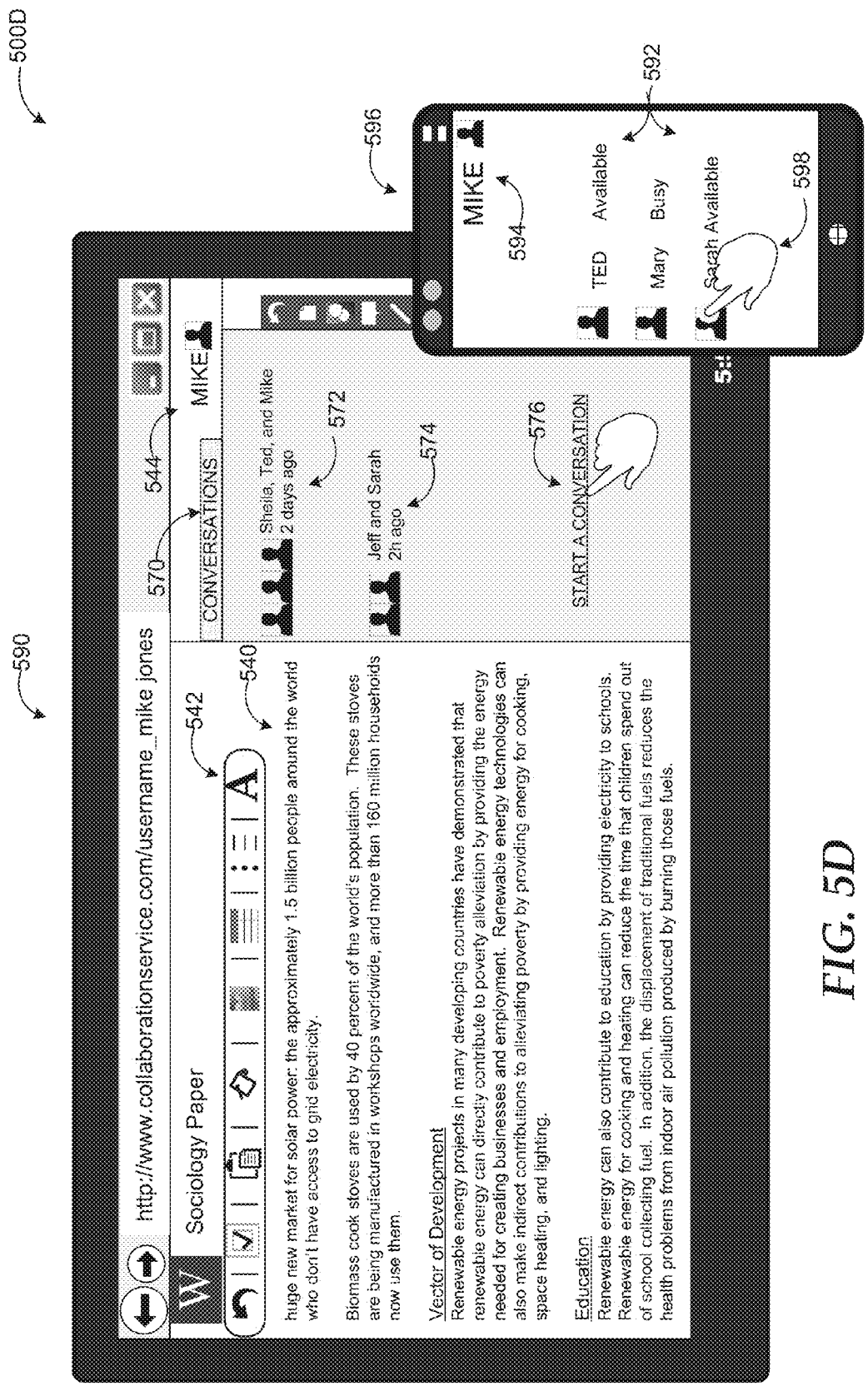

Diagram 500D in FIG. 5D shows a tablet device 590 with the user interfaces of FIG. 5A along with a smart phone 596 of the same author with a communication user interface 594. The communication user interface 594 may present a listing of participants 592 of a selected conversation on the user interface of tablet device 590 and the author may be enabled to select (598) one or more of the listed participants to participate in/initiate a conversation. The conversations may be initiated on one device and continued on another seamlessly.

Figure 6:
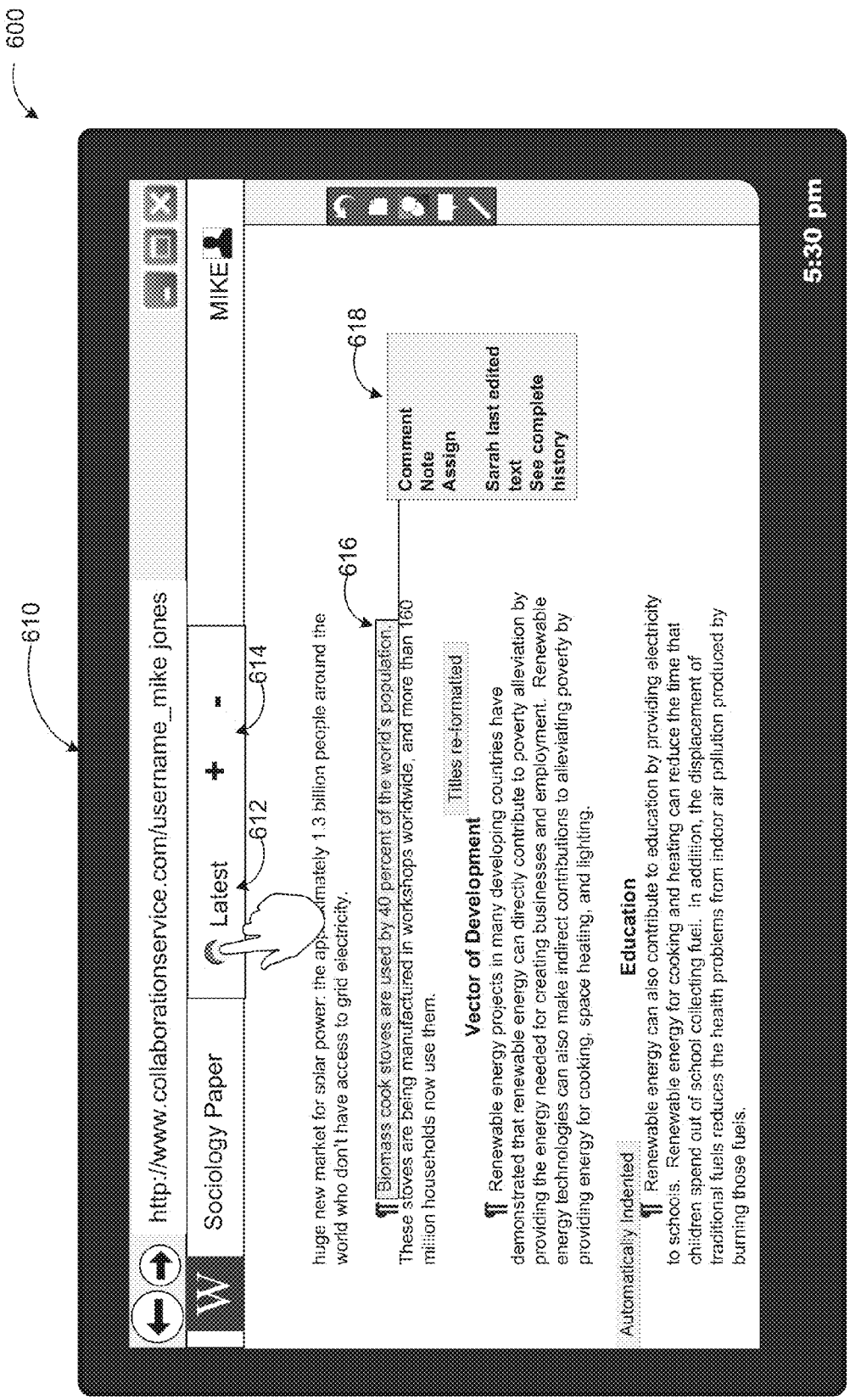
FIG. 6 illustrates a screenshot of another example user interface allowing various options on change tracking and commenting for collaboratively created content.

Referring to FIG. 6, diagram 600 illustrates a screenshot of another example user interface 610 allowing various options on change tracking and commenting for collaboratively created content.

A shared scratchpad in some embodiments may provide a shared canvas to use for co-authoring, a place to keep different versions of portions of the content (e.g., paragraphs), and a place to share ideas. The scratchpad may be a place where collaborators place their content until it is final. Collaborators may receive feedback from each other, access the scratchpad from the outside world, and easily import content into the scratchpad.

In the example embodiment shown in diagram 600, options provided to the user upon highlighting of a portion 616 of the displayed content in an options menu 618 are illustrated. For example, an author my be enabled to comment on the highlighted portion, insert a note (e.g., for the collaborators) associated with the highlighted portion, or assign the highlighted portion to a collaborator. Additional information may also be presented such as which collaborator last edited the highlighted portion. The author may also be enabled to view a complete history of edits on the highlighted portion 616 of the displayed content. In some embodiments, color/highlighting, shading, and/or textual schemes may be employed to emphasize the changes/comments.

Additional aspects shown in user interface 610 include controls for selecting changes and/or comments by going through them one-by-one (614) or selecting the latest change/comment (612).

Authors employing a collaborative authoring application according to embodiments may determine easily who—if anyone—changed their content and if they made a suggestion, what happened, etc. Communication may be through a variety of modes including comments and/or email. Changes may be edited and submitted. Notifications may be provided in a configurable manner about changes. Private editing may be enabled in co-authoring, and authors may be enabled to re-join a thread, which may be per section or for the whole document. Furthermore, a time line summary for the changes may be provided.

The examples in FIG. 1 through 6 have been described with specific user interface elements, configurations, and presentations. Embodiments are not limited to systems according to these example configurations. A collaborative authoring environment with scratchpad functionality may be implemented in configurations using other types of user interface elements, presentations, and configurations in a similar manner using the principles described herein.

Figure 7:
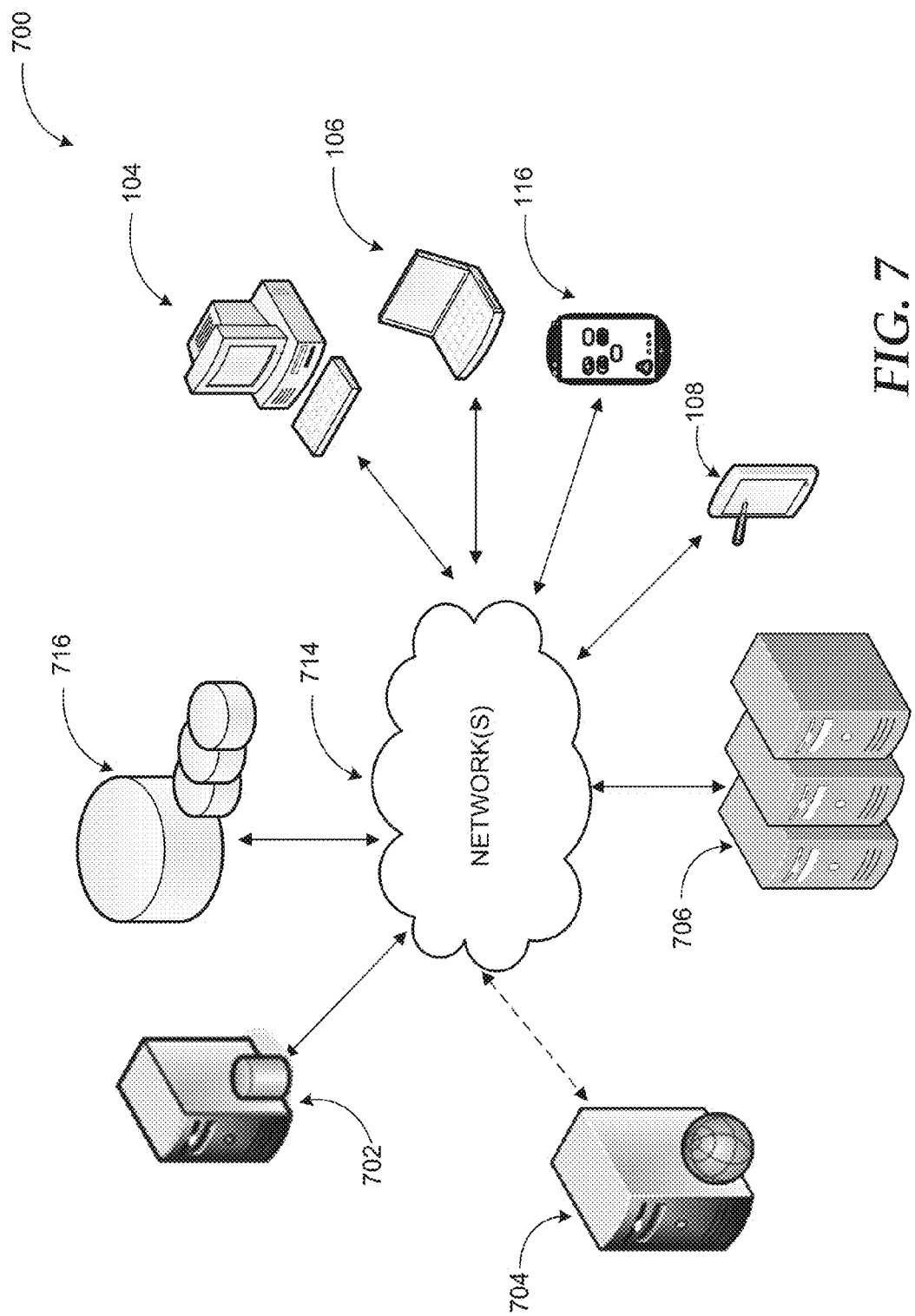
FIG. 7 is a networked environment, where a system according to embodiments may be implemented.

FIG. 7 is an example networked environment, where embodiments may be implemented. A platform providing a collaborative authoring environment may be implemented via software executed over one or more servers 706 such as a hosted service. The platform may communicate with client applications on individual computing devices such as the desktop computer 104, laptop computer 106, smart phone 116, and tablet 108 ('client devices') through network(s) 714.

Client applications executed on any of the client devices may facilitate communications with hosted content processing applications executed on servers 706, or on individual server 704. A collaborative authoring application executed on one of the servers may facilitate collaboration with scratchpad functionality as discussed above. The collaborative authoring application may retrieve relevant data from data store(s) 716 directly or through database server 702, and provide requested services to the user(s) through the client devices.

Network(s) 714 may comprise any topology of servers, clients, Internet service providers, and communication media. A system according to embodiments may have a static or dynamic topology. Network(s) 714 may include secure networks such as an enterprise network, an unsecure network such as a wireless open network, or the Internet, Network(s) 714 may also coordinate communication over other networks such as Public Switched Telephone Network (PSTN) or cellular networks. Furthermore, network(s) 714 may include short range wireless networks such as Bluetooth or similar ones. Network(s) 714 provide communication between the nodes described herein. By way of example, and not limitation, network(s) 714 may include wireless media such as acoustic, RF, infrared and other wireless media.

Many other configurations of computing devices, applications, data sources, and data distribution systems may be employed to implement a platform providing a collaborative authoring environment with scratchpad functionality. Furthermore, the networked environments discussed in FIG. 7 are for illustration purposes only. Embodiments are not limited to the example applications, modules, or processes.

Figure 8:
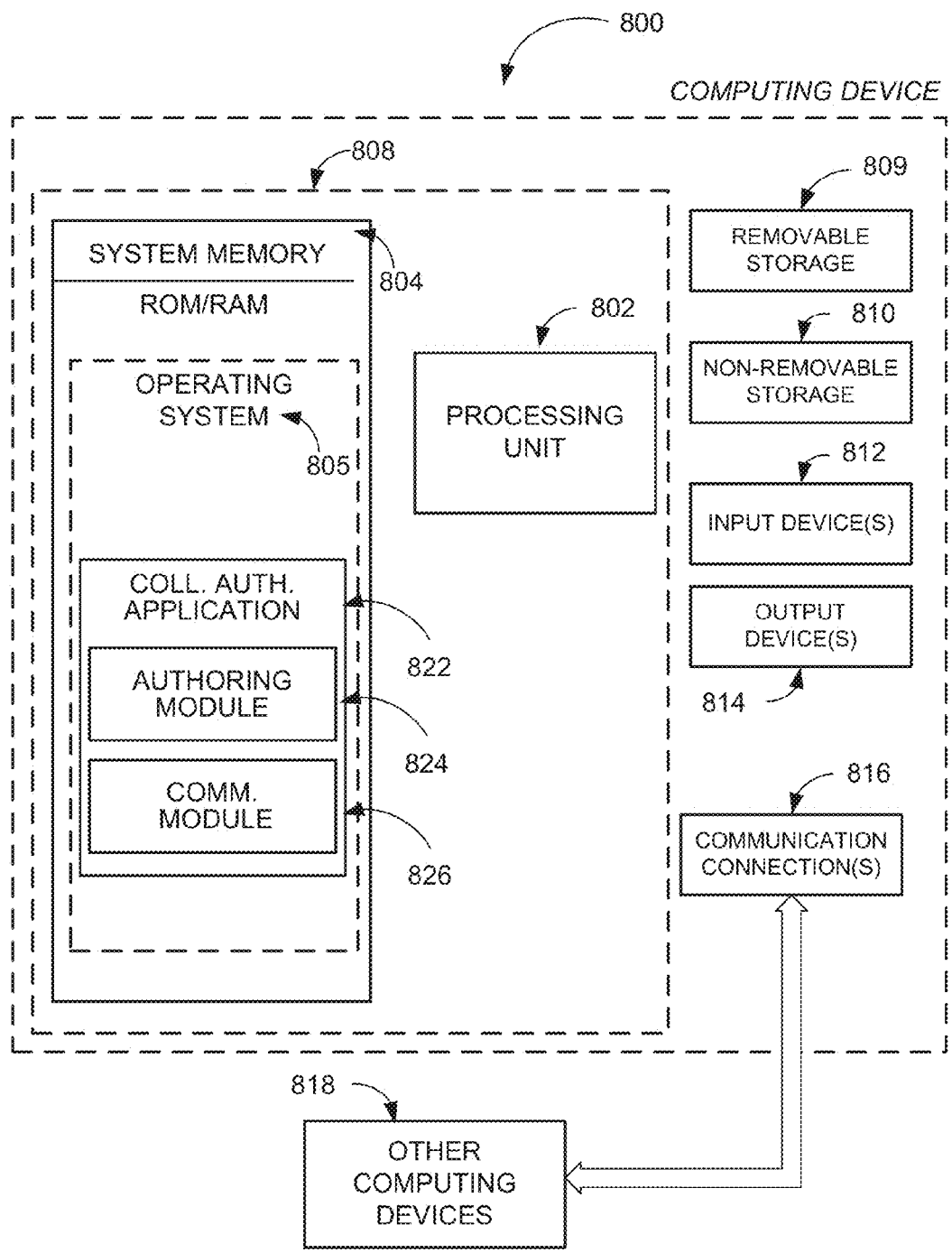
FIG. 8 is a block diagram of an example computing operating environment, where embodiments may be implemented.

FIG. 8 and the associated discussion are intended to provide a brief, general description of a suitable computing environment in which embodiments may be implemented. With reference to FIG. 8, a block diagram of an example computing operating environment for an application according to embodiments is illustrated, such as the computing device 106. In a basic configuration, computing device may be any computing device with communication capabilities, and include at least one processing unit 812 and a system memory 804. The computing device 800 may also include a plurality of processing units that cooperate in executing programs. Depending on the exact configuration and type of computing device, a system memory 804 may be volatile (such as RAM), non-volatile (such as ROM, flash memory, etc.) or some combination of the two. The system memory 804 typically includes an operating system 805 suitable for controlling the operation of the platform, such as the WINDOWS®, WINDOWS MOBILE®, or WINDOWS PHONE® operating systems from MICROSOFT CORPORATION of Redmond, Wash. The system memory 804 may also include one or more software applications such as collaborative authoring application 822, an authoring module 824, and a communication module 826.

The collaborative authoring application 822 may enable creation and editing of content by multiple authors. The collaborative authoring application 822 through the authoring module 824 and communication nodule 826 may enabled authors to create/edit content, communicate about the content creation/edit process, notify authors about changes that affect a particular author, notify about co-authors of changes, restore or compare versions and/or notes, and/or provide a pivot history by author. The collaborative authoring application 822, the authoring module 824, and the communication module 826 may be separate applications or integrated modules of a hosted service. This basic configuration is illustrated in FIG. 8 by those components within a dashed line 802.

The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage 814 and a non-removable storage 816. Computer readable storage media may include volatile and nonvolatile, removable and non-removable media implemented in any method or technology for storage of information, such as computer readable instructions, data structures, program modules, or other data. The system memory 804, removable storage 814 and the non-removable storage 816 are all examples of computer readable memory device. Computer readable memory devices include, but are not limited to, RAM, ROM, EEPROM, flash memory, or other memory technology, CD-ROM, digital versatile disks (DVD) or other optical storage, magnetic cassettes, magnetic tape, magnetic disk storage or other magnetic storage devices, or any other physical medium which can be used to store the desired information and which can be accessed by the computing device 800. Any such computer readable storage media may be part of the computing device 800. The computing device 800 may also have the input device(s) 818 such as keyboard, mouse, pen, voice input device, touch input device, an optical capture device for detecting gestures, and comparable input devices. An output device(s) 820 such as a display, speakers, printer, and other types of output devices may also be included. These devices are well known in the art and need not be discussed at length here.

Some embodiments may be implemented in a computing device that includes a communication module, a memory device, and a processor, where the processor executes a method as described above or comparable ones in conjunction with instructions stored in the memory device. Other embodiments may be implemented as a computer readable memory device with instructions stored thereon for executing a method as described above or similar ones. Examples of memory devices as various implementations of hardware are discussed above.

The computing device 800 may also contain communication connections 822 that allow the device to communicate with other devices 826, such as over a wired or wireless network in a distributed computing environment, a satellite link, a cellular link, a short range network, and comparable mechanisms. Other devices 826 may include computer device(s) that execute communication applications, web servers and the comparable device 108. Communication connection(s) 822 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 9:
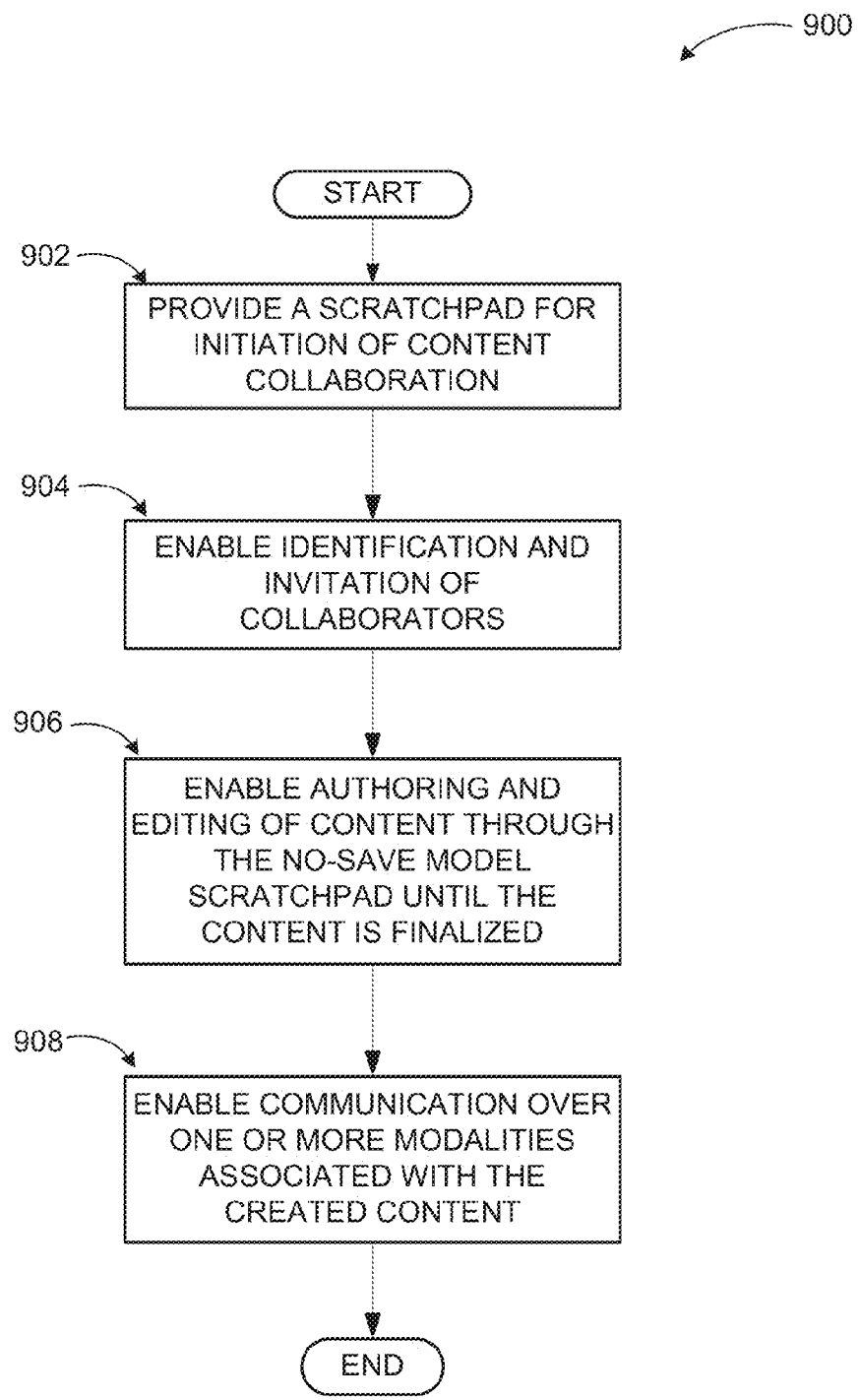
FIG. 9 illustrates a logic flow diagram for a process of facilitating real-time co-authoring with scratchpad functionality according to embodiments.

FIG. 9 illustrates a logic flow diagram for a process 900 of providing a collaborative authoring environment with scratchpad functionality according to embodiments. The process 900 may be implemented on a server or other computing device.

The process 900 begins with an operation 902, where a scratchpad may be provided through a collaborative authoring service for initiation of content collaboration with a plurality of collaborators. At operation 904, a team coordinator (and other collaborators) may be enabled to identify and invite other collaborators through various communication means.

At operation 906, the collaborators may be enabled to author and edit portions of the content through the scratchpad employing a no-save model across one or more hosted applications. At operation 908, communication over one or more modalities may be enabled in relation to the created content. The communications may include email, text messaging, video chat, audio chat, publishing to a blog/professional network, social network, and similar forms, and enable commenting and replying on edits and existing comments associated with the content.

The operations included in the process 900 are for illustration purposes. Providing a collaborative authoring environment with scratch pad functionality may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed in a physical computing device for enabling collaborative authoring, the method comprising:

providing, by an authoring module being executed by the physical computing device, a scratchpad through a collaborative authoring service for initiation of content collaboration with collaborators;

providing one or more controls on a user interface, by the authoring module being executed by the physical computing device, for identification and invitation of the collaborators;

providing one or more controls on the user interface, by the authoring module being executed by the physical computing device, for authoring and editing of portions of the content through the scratchpad employing a no-save model across one or more hosted applications;

in response to detecting a. selected portion from the portions of the content, providing, by the authoring module being executed by the physical computing device, a list of one or more collaborator actions associated with the selected portion;

in response to detecting; a selected collaborator from a list of the collaborators, providing by the authoring module being executing by the physical computing device, a related portion from the portions of the content as highlighted, wherein the related portion is associated with the selected collaborator; and providing, by a communication module being executed by the physical computing device, communication capabilities associated with the content collaboration through one or more communication modalities.

2. The method of claim 1, further comprising:
providing one or more controls on the user interface, by the authoring module being, executed by the physical computing device, for assignment of roles, assignment of access permissions, and identification of goals for the content collaboration.

3. The method of claim 1, further comprising:
providing one or more controls on the user interface, by the authoring module being executed by the physical computing device, for the collaborators to search for existing content to leverage for the created content, incorporate existing content into the created content, and create new content.

4. The method of claim 1, further comprising:
providing one or more controls on the user interface, by the authoring module being executed by the physical computing device, for the collaborators to edit content created by other collaborators, comment on content created by other collaborators, and receive information associated with the created content.

5. The method of claim 1, further comprising:
providing one or more controls on the user interface, by the authoring module being executed by the physical computing device for the collaborators to reply to one or more of edits and comments by other collaborators on the created content, receive updates upon joining the collaborative authoring service following a period of absence, and review past communications associated with the created content.

6. The method of claim 1, further comprising:
providing one or more controls on the user interface, by the authoring module being, executed by the physical computing device, for the collaborators to compare content one of created and edited by other collaborators and annotate the created content.

7. The method of claim 1, further comprising:
providing one or more controls on the user interface, by the authoring module being executed by the physical computing device, for one or more of error correction and factual correction on the created content through the one or more of automated suggestions and collaborator actions.

8. The method of claim 7, further comprising:
providing one or more controls on the user interface, by the authoring module being executed by the physical computing device, for the collaborators to define how the created content is to be consumed upon publication.

9. The method of claim 8, wherein providing one of more controls on the user interface for the collaborators to define bow the created content is to be consumed comprises defining, by the authoring module being executed by the physical computing device, one or more of a format, a style, a language, and an integrity of the created content for different consumer types.

10. The method of claim 1, further comprising:
providing one or more controls on the user interlace, by the authoring module being executed by the physical computing device, for the collaborators to identify a storage location for the created content upon finalization and define access privileges for distinct consumers of the created content.

11. The method of claim 1, further comprising;
providing one or more controls on the user interface, by the authoring module being executed by the physical computing device, for the collaborators to define update schedules and update roles for the created content.

12. A computing device for providing a collaborative authoring environment, the computing device comprising:
a display device;
a memory configured to store instructions associated with a collaborative authoring application;
a processor coupled to the memory and the display device, the processor executing the collaborative authoring application in conjunction with the instructions stored in memory, wherein the collaborative authoring application includes:
an authoring module configured to:
provide, on the display device, a scratchpad fir initiation of content collaboration with collaborators, collection of existing artifacts, thoughts, and research, and placement of portions of content created by the collaborators until the content is finalized;
provide, on the display device, one or more controls for identification and invitation of the collaborators;
provide, on the display device, one or more controls for authoring and editing of portions of the content through the scratchpad employing a no-save model across one or more hosted applications;
in response to detecting a selected portion from the portions of the content, provide a list of one or more collaborator actions associated with the selected portion;
in response to detecting a selected collaborator from a list of the collaborators, provide a related portion from the portions of the content as highlighted, wherein the related portion is associated with the selected collaborator; and
a communication module configured to:
provide communication capabilities associated with the content collaboration through one or more communication modalities.

13. The computing device of claim 12. wherein the communication module is thriller configured to:
provide, on the display device, one or more controls for the collaborators to communicate through one or more of an email, a text message, a video chat, an audio chat, a note on the created content, a publication to a social network, a publication to a professional network, and a publication to a blog.

14. The computing device of claim 12, wherein the authoring module is further configured to:
provide, on the display, device, one or more controls for definition of goals for creating the content and measurement of progress against the goals while the content is being created.

15. The computing device of claim 12, wherein the collaborators are enabled to interact with the collaborative authoring application through one or more of a touch input, a gesture input, a keyboard input, a mouse input, a pen input, a voice command, and an eye tracking input.

16. The computing device of claim 12, wherein the authoring module is further configured to:
provide, on the display device, one or more controls for the collaborators to access the scratchpad and the communication capabilities through one or more of a locally installed client application and a browser.

17. The computing device of claim 16, wherein the communication capabilities include conversations in one or more modalities and the collaborators are enabled to initiate a conversation through a first device and continue the conversation through a second device seamlessly.

18. The computing device of claim 12, wherein the content includes one or more of textual content, an image, a graphic, an embedded audio object, and an embedded video object.

19. A method for enabling collaborative authoring, the method comprising:
providing, by an authoring module being executed by a physical computing device, a scratchpad through a collaborative authoring service for initiation of content collaboration with collaborators;
providing one or more controls on a user interface, by the authoring module being executed by the physical computing device, for identification and invitation of the collaborators;
providing one or more controls on the user interface, by the authoring module being executed by the physical computing device, for authoring and editing of portions of the content through the scratchpad employing a no-save model across one or more hosted applications by enabling the collaborators to:
edit content created by other collaborators,
comment on content created by other collaborators,
reply to one or more of edits and comments by other collaborators on the created content,
receive updates upon joining the collaborative authoring service following a period of absence, and
review past communications associated with the created content;
in response to detecting a selected portion from the portions of the content, providing, by the authoring module being executed by the physical computing device, a list of one or more collaborator actions associated with the selected portion;
in response to detecting a selected collaborator from a list of the collaborators, providing, by the authoring module being executing by the physical computing device , a related portion from the portions of the content as highlighted wherein the related portion is associated with the selected collaborator; and
providing, by a communication module being executed by the physical computing device, communication capabilities associated with the content collaboration through one or more communication modalities.

20. The method of claim 19, further comprising:
displaying, by the authoring module being executed by the physical computing device, a complementary user interface displaying a list of existing conversations associated with the created content and enabling the collaborators to select a listed conversation and view the contents of the conversation or join the conversation if the conversation is still active.

* * * * *